United States Patent [19]

Miller et al.

[11] Patent Number: 4,811,144
[45] Date of Patent: Mar. 7, 1989

[54] MAGNETIC RECORDING HEAD MOTION TRANSLATION APPARATUS FOR HEAD/MEDIA EVALUATION SYSTEMS

[75] Inventors: John H. Miller, Gilroy; Peter C. Moore, Morgan Hill, both of Calif.

[73] Assignee: Cecil & Hume Associates, Inc., Morgan Hill, Calif.

[21] Appl. No.: 128,132

[22] Filed: Dec. 3, 1987

[51] Int. Cl.$^4$ .............................................. G11B 5/55
[52] U.S. Cl. ................................................... 360/106
[58] Field of Search ...................... 360/106, 107, 97–99

[56] References Cited

U.S. PATENT DOCUMENTS 4,692,821  9/1987  Zenzefilis ........................... 360/106

Primary Examiner—A. J. Heinz
Attorney, Agent, or Firm—Rosenblum, Parish & Bacigalupi

[57] ABSTRACT

A magnetic recording head motion translation apparatus for use in head/media evaluation systems is disclosed which includes a translator base for holding a magnetic recording head over a media surface, a linear drive unit, and a cam shaped in a pattern that is proportional to the path that the magnetic recording head will follow over the surface of the media. The translator base is equipped with head loading/lifting capabilities and a cam follower bearing, which maintains contact with the cam. The linear drive unit is a stepper motor in combination with a lead screw. Cross-roller bearings are used to connect the linear drive unit to the translator base, thereby providing a stable force in the direction of the Y-axis, while allowing the translator base to move in the direction of the X-axis. The cross-roller bearings are spring loaded in the direction of the cam to force the cam follower bearing to follow the cam's pattern. In operation, the cross-roller bearings directly transmit the linear force of the linear drive unit to the translator base, thereby assuring the accurate positioning of the head over the desired track of the media. At the same time, the cross-roller bearings allow the translator base to slide in the X-axis direction, thereby allowing the head to move across the surface of the media along the path determined by the pattern of the cam. Changing the cam will allow the path followed by the head across the media to be modified.

20 Claims, 4 Drawing Sheets

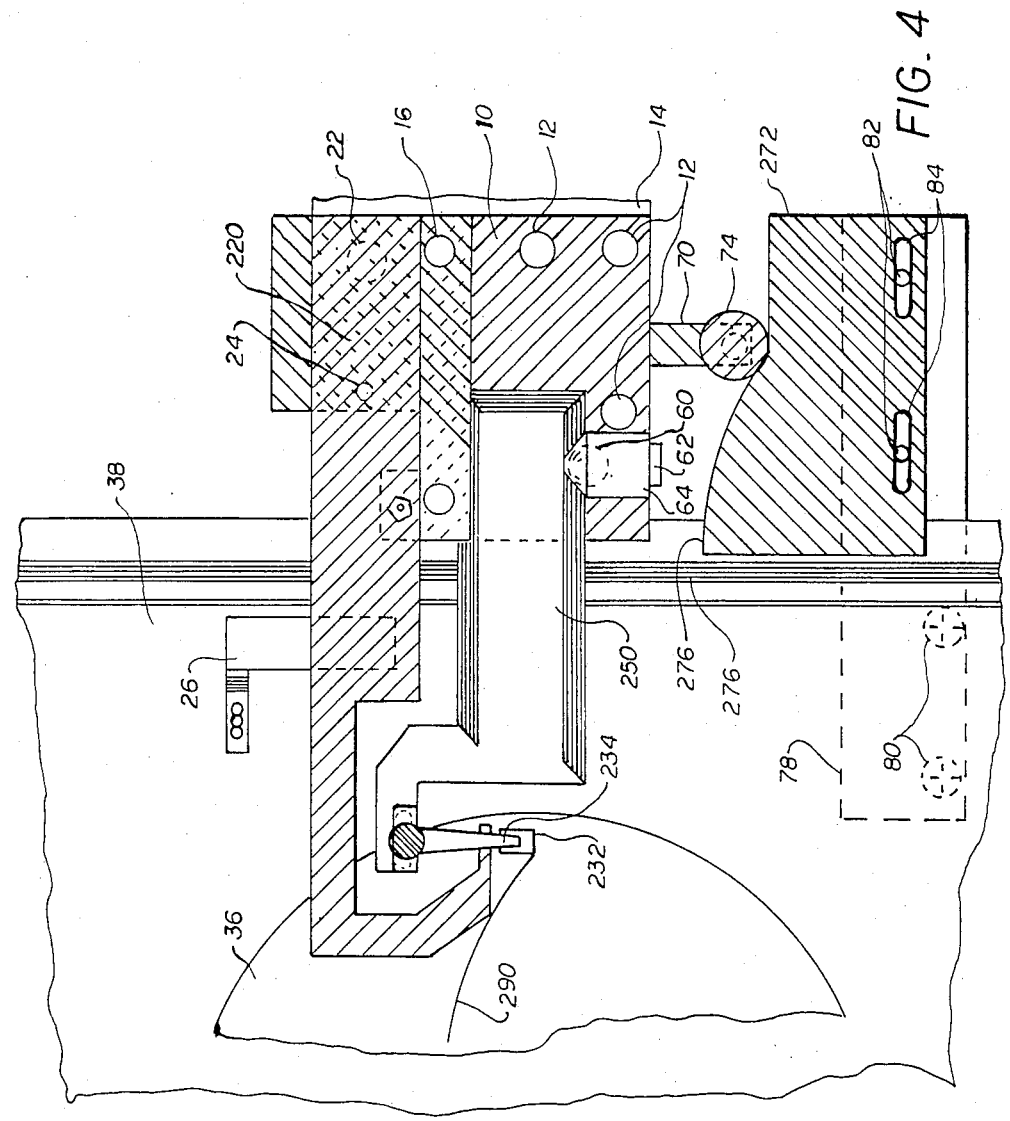

MAGNETIC RECORDING HEAD MOTION TRANSLATION APPARATUS FOR HEAD/MEDIA EVALUATION SYSTEMS

BACKGROUND OF THE INVENTION

1. Field of the Invention

The present invention relates generally to a magnetic recording head motion translation apparatus, and more particularly to a linear motion translation apparatus which can replicate the radial arc motion of a magnetic recording head which is being driven by a rotary actuator of a disk drive system.

2. Discussion of the Prior Art

The process of selecting components for use in a prototype hard disk drive system requires the analysis of a large quantity of magnetic media and magnetic recording heads. Until a particular combination is selected for use in the prototype system, the different types of heads and media will be tested for quality, as well as system compatibility. There are a number of different evaluation systems which are used for these tests, such as certifiers, glide-height testers, and spin testers. These head/media evaluation systems are typically linear drive based systems, which use a linear motor, such as a voice coil motor or stepper motor in combination with a lead screw, to move the magnetic recording head across the surface of the media.

Linear drive based evaluation systems have proved to be adequate for testing heads and media in the past because of the relatively large size of the magnetic recording heads, the relatively slow speed at which the heads could be moved across the media, and the limited requirements of prototype drive designers. In addition, many of the hard disk drive systems which have been developed have used linear drive units, or actuators, to move the heads within the drives. Thus, the ability to test the components on the evaluation system in a manner similar to how the components would be used in the disk drive was desirable, thereby making linear drive based systems acceptable.

In an effort to meet the demand for higher storage capacity, smaller, and faster disk drives, there has been a movement among drive designers to decrease the size of disk drives, increase their storage capacity, and increase their average access time. Accordingly, disk drive technology has been moving away from larger recording heads and linear actuators, which are slower, in favor of smaller heads and rotary actuators, which are faster. Evaluation systems, however, unlike the drives which the systems were designed to test, have continued to be designed as linear drive based systems, thereby creating a problem which is addressed by the present invention.

A hard disk drive magnetic recording head is typically comprised of two flat rails, running the length of the head, and a magnetic coil, which is located at the rear end of the head. A small portion of the rails, toward the front end of the head, is sloped upward so as to make each rail have a bottom surface like a snow ski. When the disk drive is turned off, the head, or bottom surface of each rail, lies flat on the surface of the media. The media will begin to spin when the disk drive is turned on, causing air travelling on the surface of the media to be forced under the sloped portion of each rail, thereby causing the head to be lifted off the surface of the media onto a small cushion of air. In other words, the combination of the sloped portion of the head and the rapidly moving air creates a wedge for lifting the head off the surface of the media. The head will normally continue to glide on a 8 to 14 micro-inch cushion of air while the media continues to spin.

An adequate wedge will be maintained as long as the head is kept relatively perpendicular to the direction of the air flow over the surface of the media. An "adequate wedge" is a wedge sufficient to lift the head off the media and keep the head from contacting the media during operation of the drive. Maintaining an adequate wedge in a linear actuator based disk drive system has not been a significant problem because the head is moved perpendicular to the direction of the air flow at all times. However, when a head is moved across the media in a radial arc, such as that created by a rotary actuator, an adequate wedge can be difficult to maintain. Almost any fluctuation in the wedge can cause the head to come into contact with the surface of the media (commonly referred to as a head crash), and result in a loss of data or even the destruction of the disk drive.

Hard disk drive magnetic recording heads could be redesigned so as to prevent any possibility of losing an adequate wedge. However, the magnetic recording head is one of the most expensive and sensitive components in a disk drive, and any significant change in its design would require a significant amount of engineering design and test time, as well as increased production costs. In addition, if redesigning the head was the most practical solution for assuring that an adequate wedge is maintained at all times, the head would have to be redesigned every time the movement of the head over the surface of the media was modified. Due to the present reliability of currently available heads and the impracticality of redesigning the heads for each new drive design, disk drive manufacturers would prefer to be able to use currently available heads in their new disk drive systems. Thus, a need exists for a head/media evaluation system for testing currently available heads which will allow the operator to readily modify the path that a head will follow across the media.

A number of head/media evaluation systems have recently been made available which utilize a rotary based actuator to move the magnetic recording head across the surface of the media. Rotary drive based evaluation systems are being developed because presently available linear drive based evaluation systems are limited to only being able to move the head across the media along a linear path. Although rotary drive based systems can accurately move a head in a radial arc motion across the surface of the media, such systems can not be readily modified to replicate a different radial arc head motion, or a linear head motion. Accordingly, the present invention describes a magnetic recording head motion translation apparatus, for use in head/media evaluation systems, which can be readily modified to change the path that the head follows over the surface of the media.

SUMMARY OF THE PRESENT INVENTION

It is therefore an object of the present invention to provide a novel magnetic recording head motion translation apparatus for use in head/media evaluation systems.

Another object of the present invention is to provide a head motion translation apparatus which can be utilized to move the head in either a linear path or radial arc across the surface of the media.

A further object of the present invention is to provide a head motion translation apparatus which utilizes a linear drive unit in combination with a cam, shaped to replicate the motion of the head, for controlling the motion of the head across the surface of the media.

A still further object of the present invention is provided a head motion translation apparatus which can be readily modified so that the magnetic recording head will follow a different path across the surface of the media.

Briefly, a preferred embodiment of the present invention includes a translator base for holding a magnetic recording head over a media surface, a linear drive unit, and a cam shaped in a pattern that is proportional to the path that the magnetic recording head will follow over the surface of the media. The translator base is equipped with head loading/lifting capabilities and a cam follower bearing, which maintains contact with the cam. The linear drive unit is a stepper motor in combination with a lead screw. Cross-roller bearings are used to connect the linear drive unit to the translator base, thereby providing a stable force in the direction of the Y-axis, while allowing the translator base to move in the direction of the X-axis. The cross-roller bearings are spring loaded in the direction of the cam to force the cam follower bearing to follow the cam's pattern. In operation, the cross-roller bearings directly transmit the linear force of the linear drive unit to the translator base, thereby assuring the accurate positioning of the head over the desired track of the media. At the same time, the cross-roller bearings allow the translator base to slide in the X-axis direction, thereby allowing the head to move across the surface of the media along the path determined by the pattern of the cam. Changing the cam will allow the path followed by the head across the media to be modified.

These and other objects and advantages of the present invention will no doubt become apparent to those skilled in the art after having read the following detailed description of the preferred embodiment which are contained in and illustrated by the various drawing figures.

BRIEF DESCRIPTION OF THE DRAWING

FIG. 4 is a partially-broken top view of an alternative embodiment of the present invention primarily suited for testing rotary actuator type magnetic recording heads.

DETAILED DESCRIPTION OF THE PREFERRED EMBODIMENT

Figure 1:
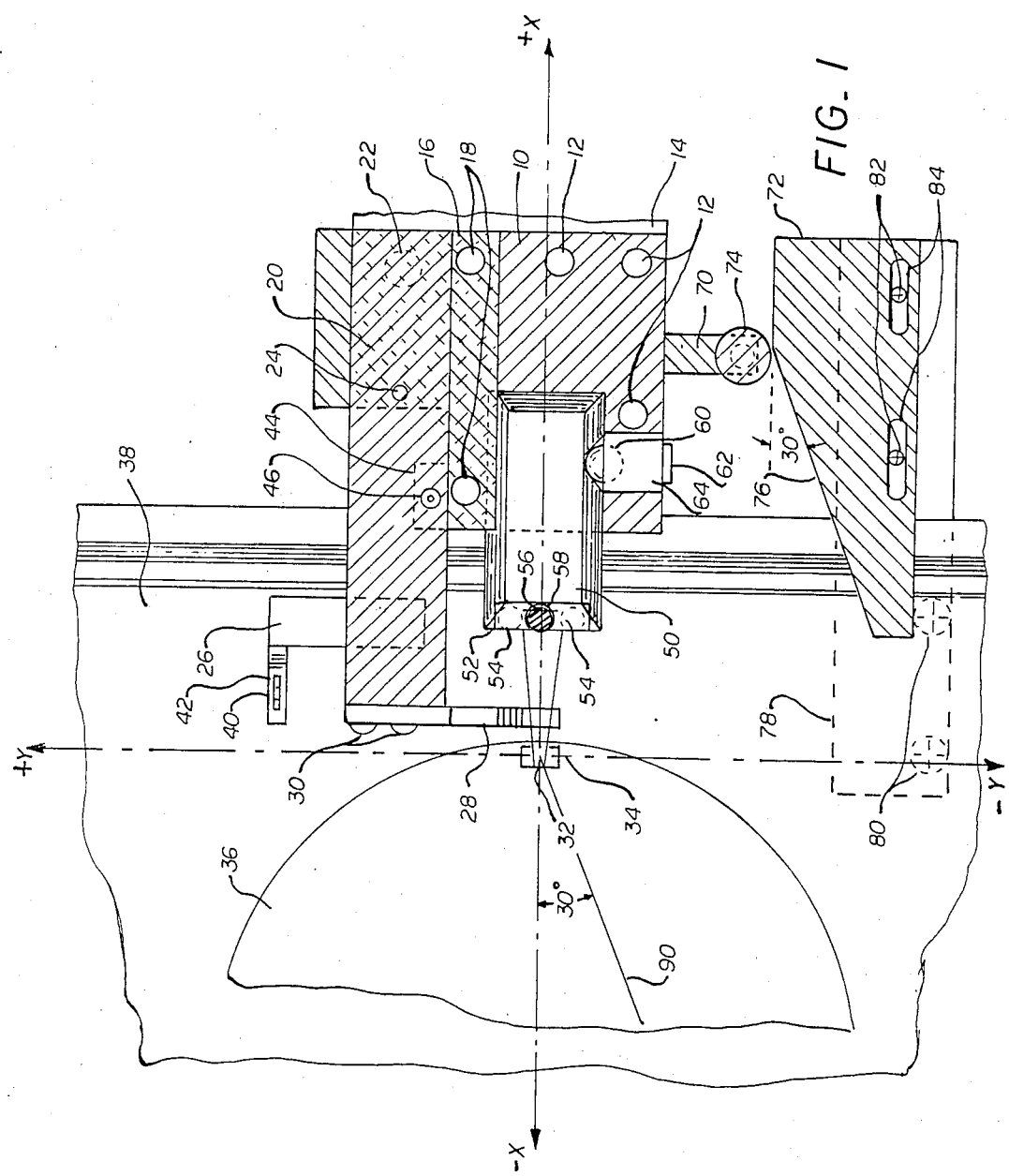
FIG. 1 is a partially-broken top view of a magnetic recording head motion translation apparatus in accordance with the preferred embodiment of the present invention.

In reference to FIG. 1 of the drawing, there is shown a partially-broken top view of a magnetic recording head motion translation apparatus in accordance with the preferred embodiment of the present invention. A translator base assembly 10 is mounted on a support platform (directly underneath base assembly 10, and not shown in FIG. 1) with mounting bolts 12. The support platform is coupled to a linear drive unit 14, which supplies a stable force in the direction of the X-axis, as shown in FIG. 1. A support bracket 16 is affixed to the right side of the upper portion of base assembly 10 with bolts 18. Support bracket 16 is shaped to form a recess along a portion of its length, in which rests a head loader/lifter arm 20.

Head loader/lifter arm 20 is spring loaded against support bracket 16 with spring 22. Spring 22 pushes the rear end of arm 20 upward, which in turn causes arm 20 to pivot over pivot pin 24 and force the front end of arm 20 downward against a slide 26. The underside of arm 20 is shaped to cause arm 20 to contact, or not contact slide 26 depending upon the position of arm 20. When arm 20 is in the lifted position, it rests upon slide 26, and when arm 20 is in the loaded position it does not touch arm 20. A finger 28 is attached to the front side of arm 20 with bolts 30. Finger 28 extends under the head support flexure 32 of magnetic recording head 34 and serves to lower(load) and raise(lift) head 34 from the surface of media 36.

Head 34 is loaded onto the surface of media 36 by moving base assembly 10 and arm 20 forward. This causes the underside of arm 20 to move along slide 26 until the two are no longer in contact, at which point head 34 is in contact with media 36, thereby providing any necessary support to arm 20. Slide 26 is affixed to spin stand base 38 with bolt 40 and the position of slide 26 may be adjusted by moving slide 26 within adjustment notch 42 and re-tightening bolt 40. A stop bracket 44 is also provided to keep arm 20 from being lowered too far, such as might happen if no media were present and arm 20 was moved to the load position. An adjustable pointer 46 is extended through arm 20 for contacting the upper surface of stop bracket 44 and thereby providing an adjustable support when necessary.

A head holder 50, with three beveled edges, rests upon the upper surface of base assembly 10 and can be wedged under a portion of support bracket 16 to provide stationary support. Head holder 50 is equipped with a flexure clamp 52 that has two clamp pins 54 which hold flexure 32 firmly in place against head holder 50. As shown in FIG. 1, two small screw holes in flexure 32 are aligned over alignment pins 56 to provide the correct positioning of head 34 with respect to head holder 50. A thumb screw 58, attached to flexure clamp 52, provides the upward force necessary to hold flexure 32 in place with clamp pins 54.

Head holder 50 is wedged under support bracket 16 with clamping ball 60. Clamping ball 60 is spring loaded against the left beveled edge of head holder 50. To load or unload the head holder 50, an operator depresses button 62 of ball support 64, thereby causing clamping ball 60 to be pulled away from the beveled edge of head holder 50.

A bearing bracket 70 is affixed to the left side of base assembly 10, which faces the cam 72. A cam follower bearing 74 is situated at the end of bearing bracket 70 so that bearing 74 contacts the patterned face 76 of cam 72. Although shown as a bracket extending from the base assembly 10, cam follower bearing 74 may also be an integral part of base assembly 10, and thereby removing the need for bearing bracket 70. Contact between bearing 74 and cam 72 is maintained by a spring loaded force applied to base assembly 10, as will be shown in FIG. 2, in the direction of the Y-axis. Cam 72 is adjustably mounted on a cam bracket plate 78, which is affixed to spin stand base 38 with bolts 80. Cam 72 is mounted to plate 78 with bolts 82 and can be adjusted by loosing bolts 82 and sliding cam 72 back and forth within adjustment slots 84.

The patterned face 76 of cam 72 can be shaped in any pattern desired. The path which magnetic recording head 34 will follow across the surface of the media can be determined by proportionally shaping patterned face 76. For instance, if the patterned face 76 of cam 72 is shaped in the form a sloping surface, magnetic recording head 34 will follow a path across the surface of media 36 which is equivalent to the patterned face 76 of cam 72. If patterned face 76 forms the equivalent of line at a 30 degree angle relative to the negative X-axis and negative Y-axis, as shown in FIG. 1, then head 34 will follow a path 90, which is a 30 degree angle relative to the negative X-axis and negative Y-axis. To make head 34 follow a radial arc path across the surface of media 36, such as would be created by a rotary actuator based disk drive system, cam 72 need only be replaced with a different cam having a differently shaped patterned face, such as is shown in FIG. 4. Although a magnetic recording head motion translator apparatus can be configured as shown in FIG. 1, and allow an operator to adequately test for head movement in a radial arc path, the translator apparatus is not limited to only this configuration, as will be shown in FIG. 4 below.

Figure 2:
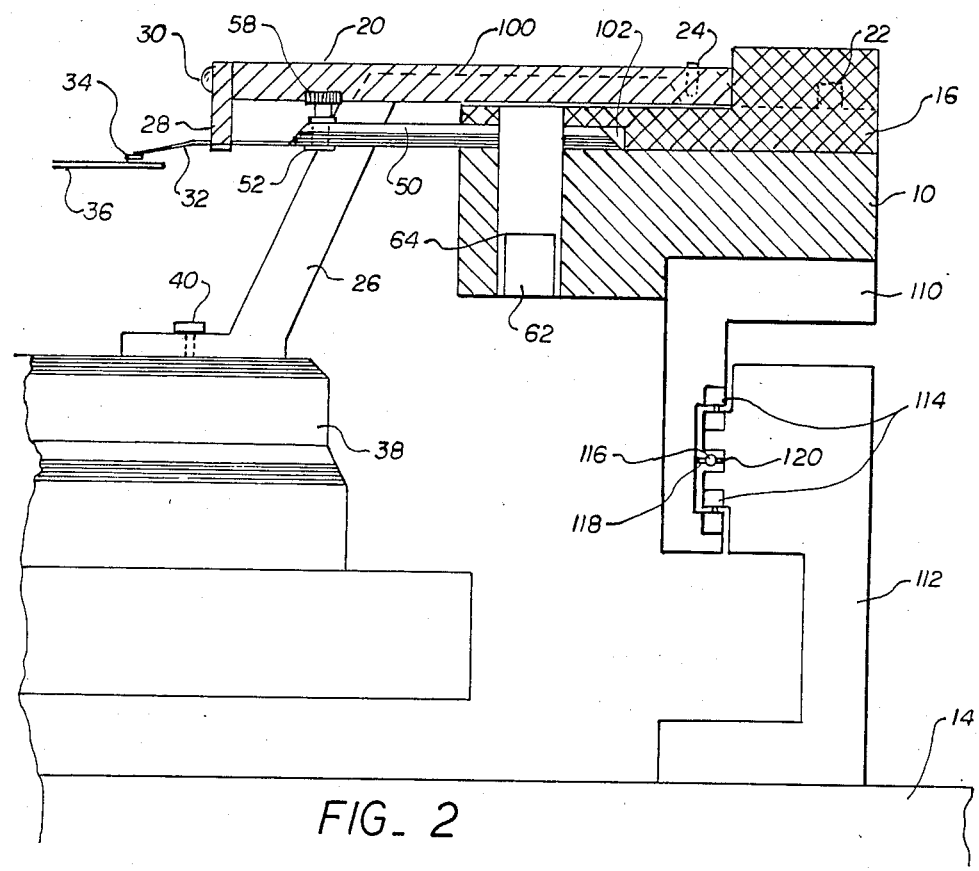
FIG. 2 is a partially-broken side view of the magnetic recording head motion translation apparatus depicted in FIG. 1, and further depicting a linear drive unit and bearing assembly in accordance with the preferred embodiment of the present invention.

The loading and lifting operation of arm 20 and the drive and support of base assembly 10 can be better understood with reference to FIG. 2, which depicts a partially-broken side view of the magnetic head motion translator apparatus shown in FIG. 1. As previously stated, the underside of arm 20 is shaped as shown by the dashed line 100 so that slide 26 is in contact with arm 20 when arm 20 in the lift position. Slide 26 is not in contact with arm 20 when arm 20 is in the load position. Arm 20 is in the lift position, as shown in FIG. 2, so slide 26 is still contacting the underside of arm 20 and providing support to arm 20 to help it keep head 34 off the surface of media 36. When arm 20 is moved forward in the direction of media 36, arm 20 will drop off slide 26, thereby causing head 34 to contact the surface of media 36. Loading and lifting the head in such a manner while the media 36 is spinning is known as dynamic loading and unloading, respectively, and will not hurt the head or the media.

FIG. 2 also shows how head holder is wedged under a portion of support bracket 16. A rectangular section 102 of bracket 16 is cut out so that head holder 50 can slide under bracket 16 and be held in place against the side and end of rectangular section 102.

As previously mentioned, base assembly 10 is mounted on a support platform 110 which is in turn coupled to linear drive unit 14. A coupling bracket 112 in mounted on linear drive unit 14. Linear drive unit 14, in the preferred embodiment of the present invention, is described as a stepper motor in combination with a lead screw, but linear drive unit 14 could also be any other type of highly controllable drive unit, such a voice coil motor. Two sets of cross-roller bearings 114 provide a connection between coupling bracket 112 and support platform 110, which is a secure and stable force in the direction of the media 36, or in the direction of the X-axis, but which is moveable in the direction of the Y-axis, as shown in FIG. 1. A spring 116 is attached between support platform spring pin 118 and coupling bracket support pin 120, so that base assembly 10 is spring loaded against cam 72 (not shown in FIG. 2). Any of a number of different types of bearing assemblies can be used in place of cross-roller bearings 114.

Figure 3:
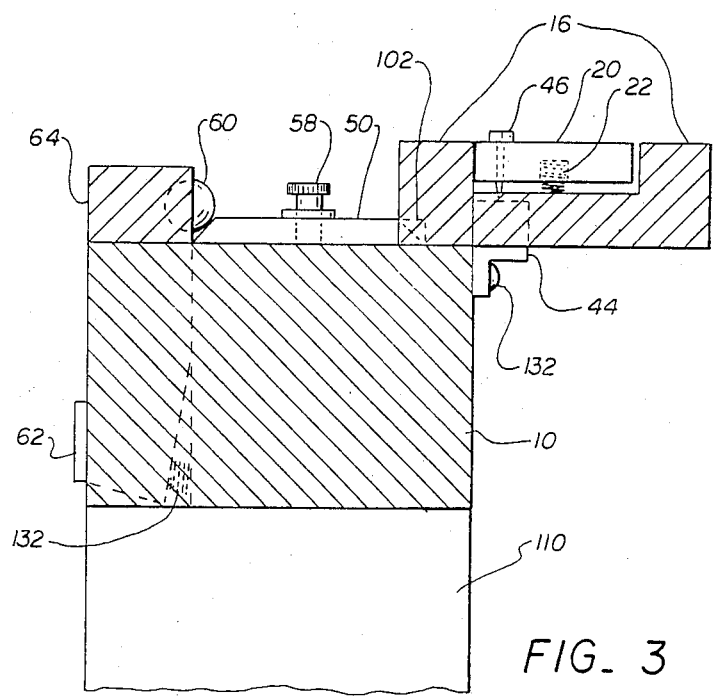
FIG. 3 is a partially-broken rear view of the magnetic recording head motion translation apparatus shown in FIG. 1.

FIG. 3 depicts a partially-broken rear view of the magnetic head motion translation apparatus shown in FIGS. 1 and 2. In addition, FIG. 3 more clearly depicts the relationship between stop bracket 44 and arm 20, arm 20 and bracket 16, and ball support 64 and base assembly 10. Stop bracket 44 is affixed to base assembly 10 with screw 130, and is located in front of bracket 16. Adjustable pointer 46 extends through arm 20 to some point above the top of stop bracket 44. Pointer 46 and bracket 44 would only come in contact with one another if no other means of support was available to arm 20.

A recess is formed in the middle of bracket 16 as shown in FIG. 3, so that arm 20 may be provided with a rear support. Arm 20 does not actually rest on the surface of bracket 16, but is instead suspended above the surface of bracket 16 by spring 22 and pivot pin 24 (not shown in FIG. 3).

The bottom portion of ball support 64 is formed to allow a spring 132 to be placed between support 64 and base assembly 10. When button 62 is depressed, ball 60 is moved away from the beveled edge of head holder 50, and when button 62 is let go, spring 132 forces ball 60 against head holder 50, thereby wedging head holder 50 into rectangular section 102 of bracket 16.

An alternative embodiment of the present invention is shown in FIG. 4, which depicts a different arm 220 and head holder 250 being utilized with the same basic components shown in FIGS. 1–3. The head support flexure 32 mounted to head 34 of FIG. 1 is shown as what can be referred to as a linear head. A "linear head" is a flexure and head configured with the flexure 32 aligned perpendicular to the length of head 34. Such a configuration is called a "linear head" configuration, because it is typically used in linear drive based systems. However, some rotary drive based disk drives utilize a configuration where the head 234 is mounted in line with the flexure 232 as shown in FIG. 4, or a "rotary head" configuration. To accommodate such variations in design, the present invention can be readily modified as shown in FIG. 4. In addition, FIG. 4 depicts the patterned face 276 of cam 272 shaped as would be required to make head 232 follow a radial arc path across the surface of the media 36.

The only real distinctions between FIG. 4 and FIG. 1 involves the arm 220, head holder 250 and cam 272. All other previously described components are the same. By simply replacing the differing components with one another, the magnetic head motion translation apparatus can be transformed to the apparatus shown in FIG. 4.

With regard to the change in patterned face 276, line 290 now depicts the path which head 232 would follow across the surface of media 36. As can be readily seen, replacing either cam 72 of FIGS. 1–3 or cam 272 of FIG. 4 with a cam having no angular distortion with respect to the X-axis would cause either head 32 or 232 to follow a linear path.

As will be appreciated, the present invention is not limited to use with magnetic recording head based evaluation systems and could be used in a number of different types of recording devices and evaluation systems, such as the disk drives themselves or optical based systems.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A motion translation apparatus for moving a magnetic recording head across the planar surface of a magnetic media, comprising:

support means for holding said magnetic recording head over said planar surface;

drive means for moving said support means in the direction of a first axis;

connector means for connecting said drive means to said support means, said connector means being adapted to allow said support means to move in the direction of a second axis perpendicular to said first axis;

a cam shaped in a predetermined pattern proportional to a path which said magnetic recording head will follow across said planar surface;

cam follower means connected to said support means and adapted to follow said pattern when said drive means moves said support means in the direction of said first axis; and resilient means for urging said support means in the direction of said second axis to maintain contact between said cam and said follower means as said support means is moved in the direction of said first axis thereby causing said magnetic recording head to follow said path.

2. A motion translation apparatus as recited in claim 1, wherein said support means, includes:

means for loading said magnetic recording head onto said planar surface and lifting said magnetic recording head from said planar surface;

a head holder means for holding said magnetic recording head over said planar surface; and clamping means for clamping said head holder means to said support means.

3. A motion translation apparatus as recited in claim 2, wherein said head holder means is adapted to hold a linear head, and wherein said means for loading and lifting is adapted to load and lift a linear head.

4. A motion translation apparatus as recited in claim 3, wherein said clamping means is a quick release mechanism, whereby said head holder means may be readily removed and exchanged with a different head holder means.

5. A motion translation apparatus as recited in claim 3, wherein said magnetic recording head is attached to a flexure, and wherein said head holder means includes a flexure clamping means for clamping said flexure to said head holder means.

6. A motion translation apparatus as recited in claim 5, wherein said flexure clamping means is a quick release mechanism, whereby said flexure may be readily removed and exchanged with a different flexure and a different magnetic recording head.

7. A motion translation apparatus as recited in claim 3, wherein said path is a radial arc.

8. A motion translation apparatus as recited in claim 3, wherein said path is linear.

9. A motion translation apparatus as recited in claim 2, wherein said head holder means is adapted to hold a rotary head, and wherein said means for loading and lifting is adapted to load and lift a rotary head.

10. A motion translation apparatus as recited in claim 9, wherein said clamping means is a quick release mechanism, whereby said head holder means may be readily removed and exchanged with a different head holder means.

11. A motion translation apparatus as recited in claim 9, wherein said magnetic recording head is attached to a flexure, and wherein said head holder means includes a flexure clamping means for clamping said flexure to said head holder means.

12. A motion translation apparatus as recited in claim 11, wherein said flexure clamping means is a quick release mechanism, whereby said flexure may be readily removed and exchanged with a different flexure and a different magnetic recording head.

13. A motion translation apparatus as recited in claim 9, wherein said path is a radial arc.

14. A motion translation apparatus as recited in claim 9, wherein said path is linear.

15. A motion translation apparatus as recited in claim 2, wherein said follower means is a cam follower bearing.

16. A motion translation apparatus as recited in claim 1, wherein said drive means is a voice coil motor.

17. A motion translation apparatus as recited in claim I, wherein said drive means is a stepper motor.

18. A motion translation apparatus as recited in claim 1, wherein said connector means is a set of cross-roller bearings.

19. A motion translation apparatus as recited in claim 1, wherein said path is a radial arc.

20. A motion translation apparatus as recited in claim 1, wherein said path is linear.

* * * * *